Figure 1:
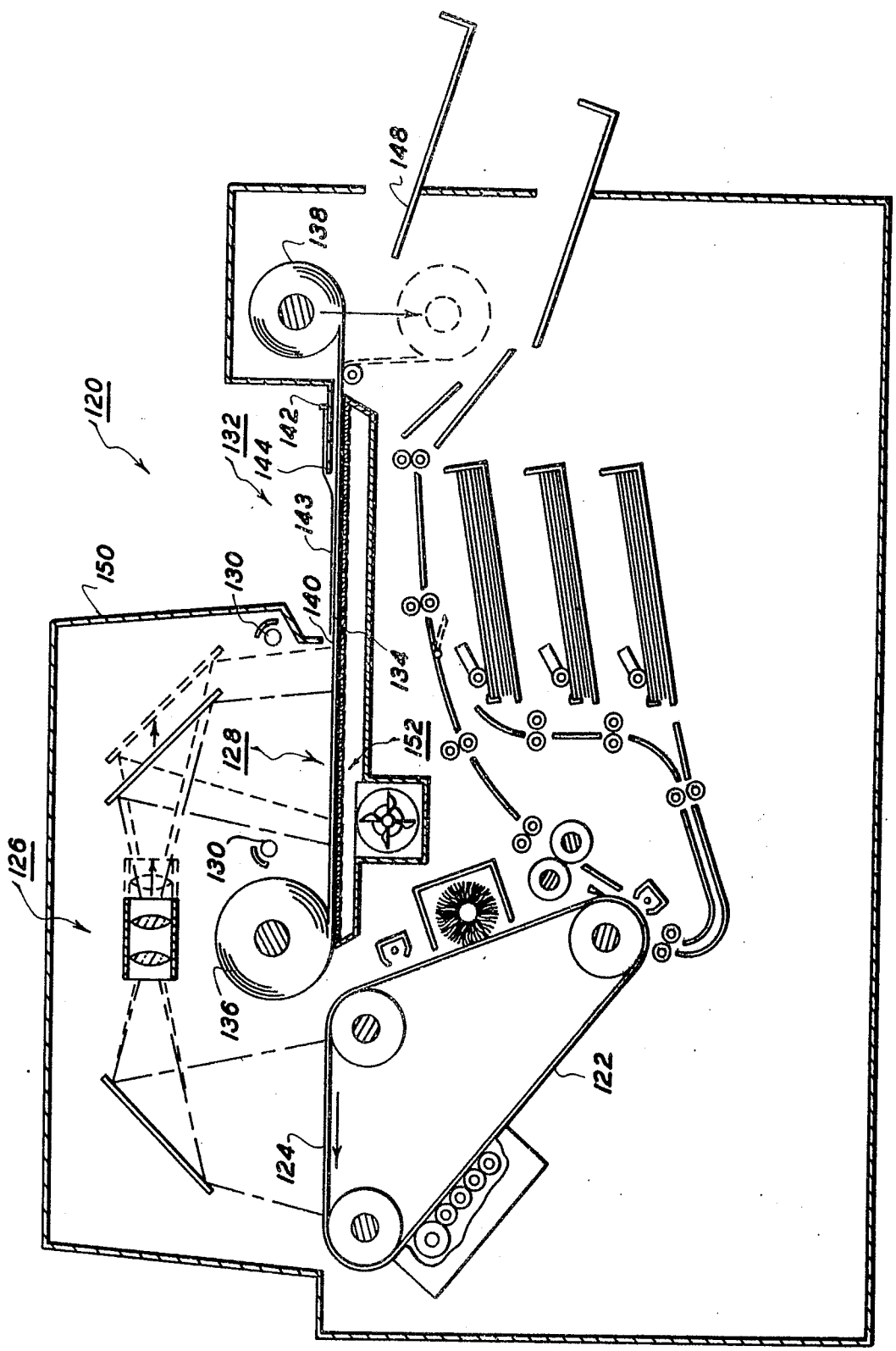

United States Patent [19]

Gerbasi

[11] 4,012,140
[45] Mar. 15, 1977

[54] COPIER DOCUMENT LOADING SYSTEM
[75] Inventor: Dennis P. Gerbasi, Webster, N.Y.
[73] Assignee: Xerox Corporation, Stamford, Conn.
[22] Filed: July 30, 1975
[21] Appl. No.: 600,331
[52] U.S. Cl. .................................. 355/76; 355/8
[51] Int. Cl.² ................. G03G 15/28; G03B 27/62
[58] Field of Search ............... 355/76, 75, 50, 51, 355/8, 9; 271/226, 233

[56] References Cited
UNITED STATES PATENTS

| | | | |
|---|---|---|---|
| 3,689,150 | 9/1972 | Nothmann et al. | 355/76 X |
| 3,891,315 | 6/1975 | Kolibas | 355/51 X |

*Primary Examiner*—Donald A. Griffin

[57] ABSTRACT

In copying apparatus in which documents are manually loaded for copying onto an advanceable document supporting and transporting vacuum web, a document loading and registration system is disclosed for the manual loading of documents onto the web with a non-skewed orientation relative to the web yet without forcing the lead edge of the document against a registration stop. A low friction document supporting surface extends to closely adjacent the web for partially slidably supporting the rear portion of a document during its loading while the front portion of the same document partially overlies the web, and a fixed document edge stop provides manual registration for the rear edge of the document on the document supporting surface.

2 Claims, 2 Drawing Figures

COPIER DOCUMENT LOADING SYSTEM

Subject matter in common with this application is disclosed in a commonly assigned pending U.S. patent application Ser. No. 560,755, filed Mar. 24, 1975, by Denis J. Stemmle, entitled, "Pre-collation Copying". The prior art references cited therein, and the disclosure thereof, are incorporated by reference in this application. The Commissioner's notice of May 19, 1975, published June 17, 1975, is noted.

The present invention relates to the copying of original documents in a copier wherein the documents are manually placed on a document transport for copying comprising an improved manual document loading and registration system.

In the copier art it is known to manually register front or side edges of a document against guides or stops associated with a copying platen of a copier. It is also known to transport and register with a belt individual documents over a copying platen by reversing the belt motion sufficiently to drive the document's trailing edge against a registration stop, e.g., U.S. Pat. No. 3,506,257, to G. E. Falker et al., issued Apr. 14, 1970, (note Col. 7) and the Xerox "9200" duplicator. While such frictional document belt systems provide automatic document registration, they do not readily provide the degree of document safety of the present apparatus.

In the system disclosed herein the documents are loaded manually, are not driven against any stops, and are not frictionally overdriven, and any slip between the document belt and the document can be limited to only controlled tension forces rather than compression forces, and those tension forces can be limited to the force exerted by a vacuum applied through the belt. Further, with the present system the document can be pre-registered on the exposed surface of a belt prior to copying with full accessability to the document, rather than the document being registered over the platen underneath (covered by) a belt.

The present invention is particularly useful as a part of an improved reproduction system for producing pre-collated copy sets from sets of individual document sheets by recirculating the documents on a web on which they are stored, as in the above-cited application of Denis J. Stemmle.

When multiple copies are made from a multi-page set of original documents, the multi-page copies thereof must be separated into separate copy sets in proper order, which is known as collation. For example, for 10 copies of a 5 page document set the copies should end up in 10 separate copy sets, each copy set having one copy of pages 1 through 5 therein, in that order.

In automatic pre-collation copying the original documents are initially loaded onto a transport system and are serially recirculated, and one copy made per page per recirculation, by the number of times corresponding to the number of copies desired. Thus, the copy sheets come out of the reproducing apparatus individually, but already pre-collated into order, i.e., in sets. Another term for a pre-collation system is a "document recirculation system", since the documents must be recirculated in some manner in order to allow their repeated sequential copying. Stating it another way, one copy at a time is made from the originals, one original page at a time, in forward or reverse page sequence, until the original document set has been fully copied. Then this copying sequence of the document set is repeated by the number of times corresponding to the desired number of copies of the document set. Thus, for the exemplary 10 copies of a 5 page book, one copy at a time would be made of each document page in this order: pages 1, 2, 3, 4, 5; 1, 2, 3, 4, 5, etc., repeated a total of 10 times to make 10 copy sets. Alternatively, for bi-directional copying the copying sequence can be 1, 2, 3, 4, 5; 5, 4, 3, 2, 1; 1, 2, 3, 4, 5, etc..

A disadvantage of most previously known pre-collation copying systems, manual or automatic, is that they require more handling of the original documents than post-collation copying systems, since each document must be repeatedly moved in and out of a copying station, (such as on and off the platen of a xerographic copier) by the number of times equal to the number of copies desired. This repeated movement and handling of the documents is time consuming and may reduce the overall effective copying speed of the reproduction system. It may also result in damage to the document sheets. The risk of document damage increases in proportion to the number of document recirculations. Paper document sheets which are thinner than average, or irregular in size, or which have aged, or which have tears or curls or fastening means therein, are particularly susceptible to damage or destruction by repeated handling in conventional type document transport systems, where the document may be subjected to relative motion with respect to feed rollers, belts, wheels, gates or the like. Also, there may be a psychological resistance by an operator to placing a document inside a mechanism where it cannot be seen and is being operated on. Thus, manual document separation, movement and placement is preferable to the extent practical.

The above and other problems in multiple set document copying can be avoided by providing a pre-collation system as in the above-cited Stemmle application in which document recirculation for multiple serial copying is provided while retaining document sheets on an elongate web on which the documents are initially hand loaded. The web can be wound in document retaining storage scrolls for minimizing document handling and maximizing document protection, and the web can be wound and unwound between the document retaining scrolls for the multiple pre-collation document copying. The web can be repeatedly wound and unwound from one scroll to the other (recirculated) to repeatedly expose individual documents on the web in an exposed portion of the web extending between the scrolls. The documents can be optically exposed on the web between the scrolls for copying, and a simple optics arrangement may be utilized.

The documents in the system disclosed herein need not forceably contact any other object than the retaining web itself, and there need be no substantial relative motion required at any time between the document sheets and any other object during copying, including the web. This reduces the danger of document damage greatly.

In the disclosed system, the advantages of manual initial document placement can be provided. Yet once the documents are placed on the web, all of the subsequent recirculation of the documents for pre-collation copying may be accomplished by the system itself without manual intervention. Further, the unloading of the documents can also be automatically accomplished.

Thus, all of the advantages of pre-collation copying can be provided, yet with a minimization of document handling disadvantages. Further, the present system is compatible with known automatic sheet separating or feeding systems, since only a single separating and loading operation need be performed on each document regardless of the number of copies.

Exemplary embodiments of the present invention are shown and described hereinbelow as incorporated into generally known exemplary xerographic apparatus and processes. Accordingly, said xerographic apparatus and processes themselves need not be described in detail herein, since various printed publications, patents and publicly used machines are available which teach details thereof to those skilled in the art, including those cited in the above-cited Stemmle application.

Figure 2:
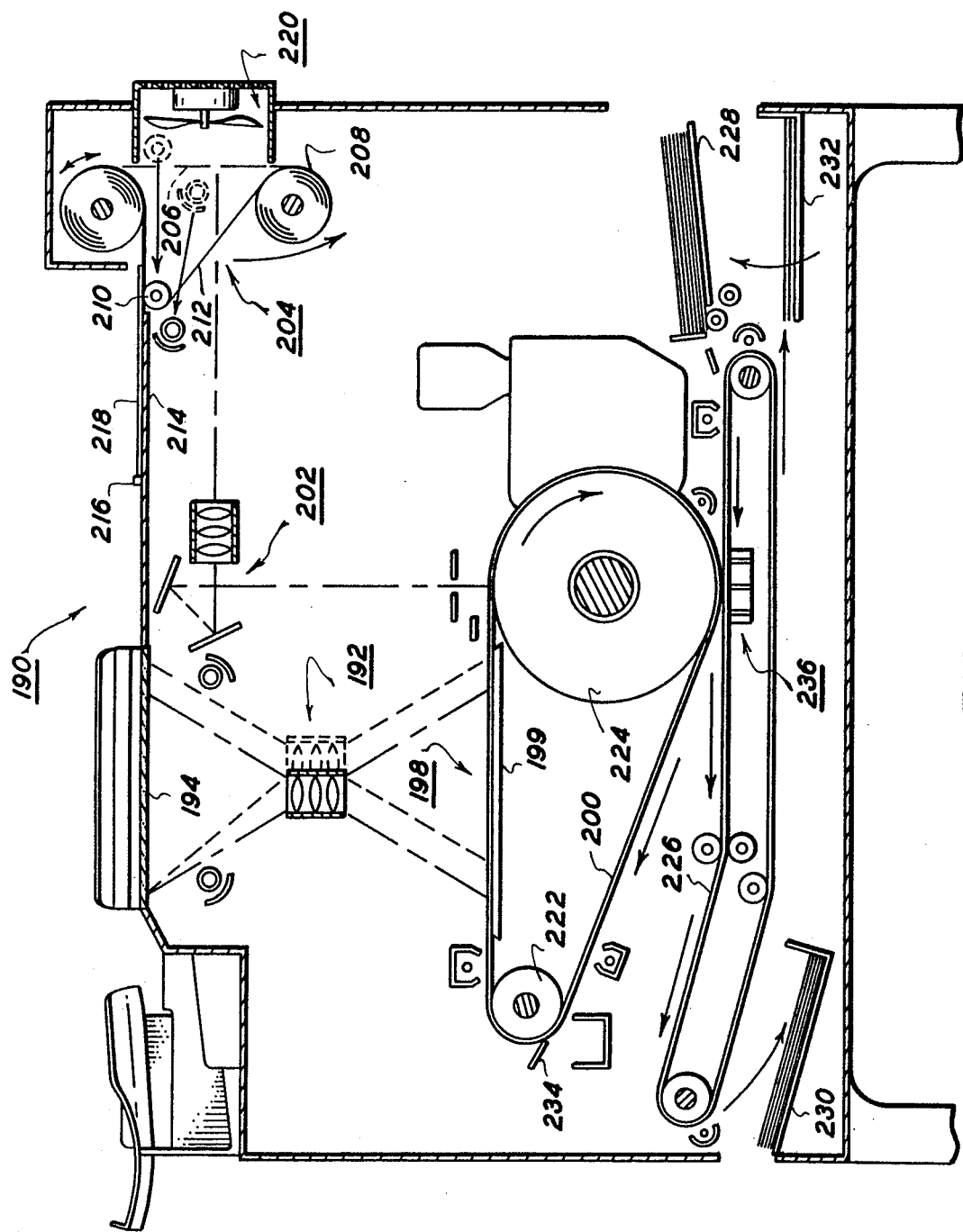

Further objects, features and advantages of the present invention pertain to the particular apparatus, steps, and details whereby the above-mentioned aspects of the invention are attained. Accordingly, the invention will be better understood by reference to the following description and to the schematic drawings forming a part thereof, which are approximately to scale except where otherwise noted, and wherein:

FIG. 1 is a schematic side view of an exemplary document handling system in a xerographic copying apparatus and in accordance with the present invention; and FIG. 2 is a schematic side view of a second embodiment in accordance with the present invention.

Referring now to the drawings, FIGS. 1 and 2, there are illustrated therein two different embodiments only as examples of the present invention. In these embodiments the document handling systems have different orientations and combinations with different exemplary xerographic (or other electrostatographic) copying systems. Both of these embodiments provide automatic pre-collation document copying with manual document loading as described above in the above background discussion.

In both the emodiments of FIGS. 1 and 2, it may be seen that the documents are loaded upon, and automatically recirculated by, an elongate windable document holding web. Means are provided for forming a spaced pair of oppositely wound scrolls from this web for winding up the documents loaded onto the web into these scrolls. The documents are retained between the turns of the web on both of the scrolls during the copying operation. It may be seen that the web has a minor intermediate unwound segment extending between the two web scrolls where the documents are exposed for copying by appropriate optical imaging means. The document imaging means projects the document images into a xerographic drum or belt or other imaging surface. (Photoreceptive belts are shown in these two examples). Appropriate or conventional drive means are provided for recirculatingly winding and unwinding the web between one web scroll and the other so as to recirculatingly expose, in sequence, the individual documents on the web as they appear on the unwound intermediate web segment. The documents are thereby exposed in the pre-collated order in which they are loaded onto the web, or/and the inverse. Thus, correspondingly pre-collated copy sets can be produced by the web recirculations between the scrolls. As the documents are loaded onto the web they are wound up on the web into one of the scrolls so that the documents are trapped between the web layers of the scroll. Likewise, when the web is recirculated onto the other scroll the documents may be retained in position solely by being held between the layers of the other scroll. The documents may each be exposed as the document set is being loaded onto the web to provide a "proof set".

In the intermediate web segment between the scrolls the documents are preferably held in position on the web by providing a web with an air permeable structure and by providing a vacuum platen and vacuum chamber on the opposite side of the web from the document retaining side. The porous web and the exposed document thereon are thereby held against the vacuum platen within the span region of the web between the scrolls. The retaining of the documents on the web in the exposed inner-scroll segment is also assisted by providing a substantially linear and planar configuration of the web between the two scrolls.

The scrolls illustrated in the Figures are oppositely wound and convoluted and allochiral. The intermediate segment of the web forms a document retaining nip on its document retaining side with each of the scrolls where the web winds into the scrolls, i.e., both of the nips are on the document retaining side of the web. Further, both of the scrolls are on the document retaining side of the web in their document recirculating position. This insures that the documents are maintained on the web on its document retaining side continuously, and that the documents are maintained only in a concave orientation on both of the scrolls (concave relative to the side of the documents being imaged).

Referring now in more detail to the document retaining web, it is preferably thin, flexible, but substantially non-stretching Mylar plastic or other suitable web material, highly perforated over at least its major central portion to render it air permeable. Its outer edges may be unperforated for the web to be frictionally driven by pinch rollers in the exposed intermediate area. The web or belt may also be covered by a thin layer or coating of high friction material. The document transporting and supporting side surface of the web provides a high friction surface relative to the documents to prevent substantial document movement or sliding on the surface of the web.

Referring first to FIG. 1, there is shown an embodiment 120. The xerographic processor here comprises a flexible photoreceptor belt 122 and associated components. This type of xerographic processor is disclosed in the Xerox Corporation 9200 high-speed xerographic duplicator and in patents thereon. Accordingly, its details need not be described herein.

The configuration of the photoconductive belt 122 provides a full frame planar imaging area 124 thereon. This allows the use of a simplified optics system 126 in which the entire document is imaged at once at an imaging station 128. Illumination is preferably provided substantially instantaneously, so as to "stop" document movement, by a flash lamp illumination system 130. This full frame image is then reflected as shown through two large stationary mirrors and a lens onto the belt imaging area 124. Dashed outline positions of the two mirrors and the lens are shown to illustrate alternative positions for variable reduction of the document's image size on the final copy sheet.

It is noted that no second or alternative optics path from a stationary platen document copying station is provided in this embodiment 120. However, it will be appreciated that one can be provided, and with a simple optics arrangement.

The document web 134 and the web scrolls 136 and 138 are shown here in their copying or document recirculating position. This is also their document loading position for this embodiment.

Referring now to the automatic document handling system 132 of FIG. 1, there are significant differences in the document loading, registration, and imaging from conventional document handling systems.

The exemplary document loading arrangement and operation for loading documents onto the intermediate segment 140 of the web 134 will be described first. An exemplary document 143 is shown in the loading position. It may be seen there is a document loading edge stop 142 substantially spaced from the imaging station 128 and the web 134. Also, there is a connecting document support surface 144 extending from the document edge stop 142 toward the web 134. A portion of the web intermediate segment 140 adjacent the support surface 144 provides a document loading and support area in combination therewith. The support surface 144 is closely spaced above and generally parallel the web 134 here, and both are horizontal and fully exposed. The document edge stop 142 provides registration of the rear edge of the document 143 being loaded onto the web 134, while the opposing or forward edge of the same document 143 is being simultaneously directly placed on the intermediate segment 140 of the web 134. The support surface 144 provides sufficient support of the rear portion of the document off of the web and is generally planar and smooth (low friction) to allow manual readjusting or correct positioning of the document as it is being loaded against the edge stop 142. The edge stop 142 extends linearly at right angles across the web 134. Thus, the documents may be fully manually registered and loaded on the web without any significant skew of the document relative to the direction of movement of the web.

The support surface 144 here is shown as supporting a relatively small portion of the maximum document dimensions capacity, which extends here almost to the imaging station 128. However, it will be appreciated that the support surface 144 may support a larger portion of the document and may also be mounted so as to be angled downwardly toward the web 134.

It may be seen that in contrast to conventional document registration systems that the document lead edge here is not fed into any stop fingers. The web movement during loading will pull the document away from the edge stop 142 rather than drive the document against it. The edge stop 142 may be a simple fixed surface or lip upstanding relative to and integral the support surface 144. It does not need to be retractable or movable in any manner.

As soon as the operator releases his hand from the document 143 and causes the web to advance, the vacuum and gravity attraction to the web 134 of that portion of the document which is resting on the web (rather than on the support surface 144) will carry the document off on the web 134 directly into the imaging station 128, with the trailing portion of the document sliding off of the support surface 144 onto the web and away from the edge stop 142.

The document edge stop and the support surface 144 are spaced away sufficiently from the web 134 so that they do not interact in any way with the web or documents thereon once the documents are loaded. Thus, high speed recirculating copying by web movement between the two scrolls 136 and 138 may be accomplished without any mechanical contact with the document whatsoever.

The edge position of the document may be registered or known by the machine logic relative to the web position if the web is stopped during each document loading. The document position on the web is then known for registration purposes by the machine logic for its subsequent recirculating copying at the imaging station 128.

Various automatic document unloading arrangements for documents on the web 134 may be provided. Illustrated here is an unloading arrangement wherein the scroll 138 has moved downwardly to arcuately loop web 134 around a supporting roller to provide automatic stripping of documents into a document catch tray 148 upon the winding up of the web 134 into the scroll 138.

Referring now to the imaging of documents which have been loaded onto the web 134, it may be seen with the arrangements shown that a light shield 150 is provided to enclose the imaging station 128 and the illumination from the flash lamps 130 within the apparatus 120. The document edge stop 142 is outside of and substantially spaced from the light shield 150 so that the entire document loading area is in full view and freely accessible by the operator. Yet the web 134 passes immediately from this document loading area into the imaging station 128 under the edge of the light shield 150, which extends toward, but is closely spaced from, the intermediate segment 140 of the web. An immediate proof set copy can be initiated as each document is loaded. In effect, the light shield 150 divides the web intermediate segment 140 into two portions, one of which is outside the light shield for document loading (with light shielding) and the other of which is within the light shield for imaging of the documents. Both of these portions of the intermediate segment 140 are in the same plane and utilize the same or similar vacuum system 152 applying a vacuum therethrough. The entire intermediate segment 140 has a desirable horizontal and upwardly facing orientation.

Another advantage of the zenon flashlamp 130 simultaneous imaging of the full document is that this type of illumination effectively optically stops the image like a high-speed camera even though the document may be moving quite rapidly on the web 134. Thus, if desired, the web 134 during copying may be continuously moved between the scrolls in either direction, i.e., the documents may be copied as they pass through the imaging station 128 from either direction. There is no problem with maintaining proper scanning direction and speed coordination with the photoreceptor belt 122, unlike the slit scanning or "flowing light image" systems of other embodiments, which require smooth precise web driving accurately synchronized with the photoreceptor surface movement. However, if such bi-directional document scanning is uitlized here, an inverter is needed to invert each page of alternate copy sets.

Referring now to FIG. 2, there is shown another embodiment 190. In this embodiment, a separate optics system 192 for the stationary platen 194 has a zoom lens and provides a variable magnification of a full frame exposure of the platen onto a flat imaging area 198 of a photoreceptor belt 200. The platen 194 is flash illuminated so that the belt 200 does not have to be stopped for imaging of a document on the platen 194. A separate automatic or semi-automatic document handling system may be provided for the platen 194. The belt 200 is held planar in the belt imaging area 198 by an underlying rigid planar slide support 199 which may be low-friction coated and include magnetic attraction of the belt for holddown thereon.

A separate optics system 202 is provided for slit scanning of moving documents on the web/scroll automatic document handler 204 in a manner similar to that previously described above. This automatic document handling system 204 of FIG. 2, however, differs in some respects from that previously described. Here, neither of the scrolls is ever displaced relative to the intermediate segment 206 of the web 208. Rather, as illustrated, for loading and unloading of documents from the web 208 the intermediate segment is deformed. Means are provided for displacing a roller 210 from behind the normal planar document imaging location of the intermediate segment 206 (shown as a dashed line). The roller 210 is moved into the web to pull out the intermediate segment 206 into a large loop 212 with an arcuate configuration around the roller 210.

It may be seen that the loop 212 on one side of the roller 210 is deformed into a horizontal position in line with a document support surface 214 and a document edge stop 216 for document loading, similar to the corresponding components 142 and 144 in FIG. 1. A document 218 thereon is illustrated. The vacuum system 220 has sides (not illustrated) extending out sufficiently to engage the sides of the loop 212 and maintain a vacuum within the extended web loop 212 for such document loading. The same (or separate) means can be provided for deforming the web 208 for document unloading into the same area. Forming a bight or loop away from the scrolls provides operator access for loading without interference from the scrolls, and allows positioning of the web for loading in one plane and for copying in another.

In the embodiment 190 of FIG. 2, the loop 212 is formed in the web intermediate segment 206 by the roller 210 only during loading and unloading, and the intermediate segment 206 normally extends linearly between the web scrolls for copying of documents thereon. It will be appreciated that a fixed smooth arcuate slide surface may be used in lieu of the roller 210. Since the documents being loaded are fed into the scroll nip without first passing through the imaging area, a proof set is not provided in this embodiment while loading.

Referring to the xerographic processor itself in FIG. 2, it may be seen that the photoconductive belt 200 is mounted on two support rollers 222 and 224, the larger of which is approximately the diameter of a conventional xerographic drum, thus allowing the use of conventional xerographic processing elements therearound. An electrostatic copy sheet transport belt 226 is illustrated for feeding the sheets from the copy sheet tray 228 to the transfer station (against the belt 200) and then on through a fuser into the copy sheet output tray 230. Alternatively, the copy sheets will be retained on the bottom flight of their transport belt 226 and returned to a duplex tray 232, which then pivots up to provide the recirculation of the copy sheets therein for second-side copying back on the transport belt 226. Inverted (face down) copy sheet output stacking is shown, however, collated direct face-up ouput can be provided readily here instead. Since the documents are preferably loaded in forward serial order (1, 2, 3 . . .) they can be copied here in reverse order upon the first web recirculation after loading. That provides collated face-up ouput.

The illustrated blade cleaning system for the belt 200 is adjacent the small support roller 222, and the cleaning blade 234 is downwardly inclined for gravity assistance in the removal of a toner therefrom. A brush cleaning system can also be utilized. This cleaning station location is spaced a substantial distance away from the image transfer station 236 and other processing elements, for reduced toner contamination.

It may be seen that there have been disclosed herein embodiments of an improved document handling system of a copying apparatus. It will be appreciated that various modifications and improvements may be made therein by those skilled in the art. The following claims are intended to encompass all such modifications and improvements as fall within the spirit and scope of the invention.

What is claimed is:

1. In a copying apparatus in which documents having a given front edge to rear edge dimension are manually loaded for copying onto an advanceable integral document supporting and transporting web including vacuum document retaining means for retaining documents without slippage on said integral web for copying, the improvement in document loading and registration means for assisting in the manual loading of documents onto said web front edge first with a pre-registered non-skewed orientation of the documents relative to said web without restraining the front edge of the documents, comprising:

slidable document supporting surface means extending to a terminating edge closely adjacent said web for only partially, slidably, supporting a rear portion of a document, document rear edge stop means transverse said document supporting surface means for manually registering the rear edge of the document on said document supporting surface means with a front portion of the same document partially overlying said web, said document rear edge stop means being spaced from said terminating edge of said document supporting surface means and said web by a distance less than the front to rear edge dimensions of the document being registered, said document rear edge stop means extending upwardly relative to said document supporting surface means and transversely to said web, and means for advancing said web after a document has been registered against said rear edge stop means with said vacuum document retaining means activated to prevent slippage between said web and the document and to pull the entire document slidably from said document supporting surface means onto said web.

2. The copying apparatus of claim 1, wherein said document supporting surface means and said document edge stop means is an integral unit.

* * * * *